March 10, 1964 G. H. ROHRBACK 3,124,771
CORROSION MEASURING PROBE AND METHOD OF MAKING SAME
Filed June 26, 1961
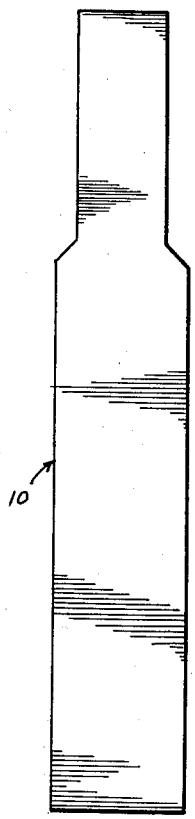
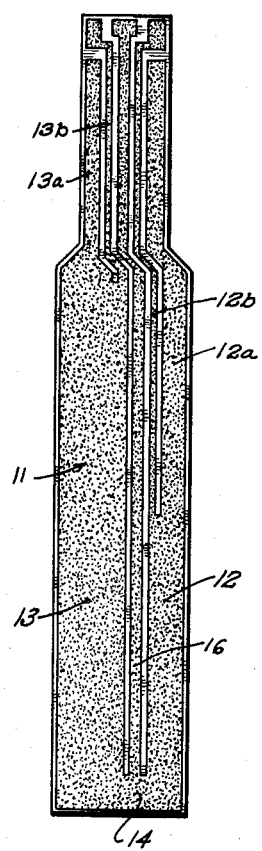
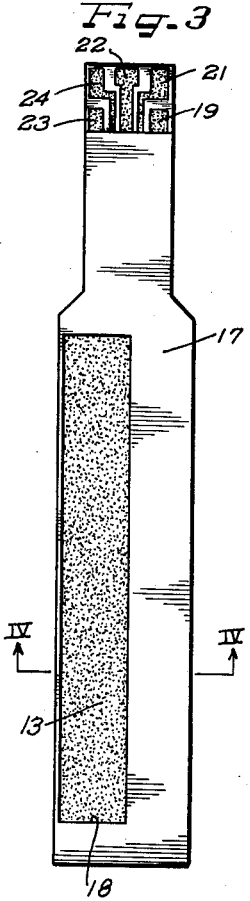
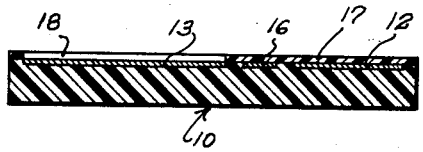
INVENTOR.
Gilson H. Rohrback
BY
ATTORNEYS

United States Patent Office 3,124,771
Patented Mar. 10, 1964

3,124,771
CORROSION MEASURING PROBE AND METHOD OF MAKING SAME
Gilson H. Rohrback, Whittier, Calif., assignor to Magna Corporation, a corporation of California
Filed June 26, 1961, Ser. No. 119,482
7 Claims. (Cl. 338—13)

This application is a continuation-in-part of application Serial No. 55,648, filed September 13, 1960.

The present invention is directed to an improved corrosion measuring probe assembly and to a method of making the same.

The corrosion measuring probes of the present invention are intended for use in corrosion measuring systems which detect the progress of corrosion by changes in electrical resistance in a sensing element located in the environment. Such changes in electrical resistance occur as corrosion proceeds due to reduction of its cross-sectional area. In order to eliminate the effects of temperature changes, the sensing element is combined with a reference element usually composed of the same metal as the sensing element and located in the environment at a position where it experiences the same temperature changes as the sensing element. However, the reference element is coated or otherwise protected against the effects of corrosion while the sensing element is not. The sensing element and the reference element are then employed as two arms of a resistance measuring network such as a Wheatstone bridge or a Kelvin bridge which determines the ratio of resistance between the sensing and reference elements. Since any changes in temperature are reflected as identical incremental changes in the resistance of both the sensing and the reference elements, the ratio which is obtained in these circumstances is a measure of the progress of corrosion alone.

The present invention provides an improved probe assembly incorporating both a sensing element and a reference element. The improved probe has numerous advantages over the type of probe using self-supporting wires in that very thin shim stock can be used in its manufacture, giving the probe a higher degree of sensitivity. The probe of the present invention also provides improvements over probes which have heretofore employed shim stock in that more adequate resistance to the environment is provided for the reference element, and better mechanical support is provided for both elements.

An object of the present invention is to provide an improved corrosion measuring probe which is highly sensitive.

A further object of the present invention is to provide an improved corrosion measuring probe which can be made in large sizes without sacrifice in mechanical rigidity.

A further object of the invention is to provide an improved method for manufacturing corrosion measuring probes of the type described.

A still further object of the invention is to provide a corrosion probe which is inexpensive to manufacture.

In the manufacture of the improved probe of the present invention, I first provide a substrate of an electrically insulating material which is also resistant to chemical attack, and is preferably also resistant to high temperatures. Depending upon the environment to which the probe is subjected, materials such as phenolic resins, epoxy resins, furane resins, and polyvinyl polymers can be suitably employed. In addition, non-organic materials such as glass, hard rubber, ceramics, and the like may also be used. Combinations of these materials such as an epoxy resin filled with glass fibres are also suitable materials.

The substrate can be of any suitable thickness but for probes of general utility, it is sufficient to have a thickness of ⅛ inch or less.

The substrate is then provided with a corrodible metallic film in a definite pattern over the substrate. Basically, the pattern consists in a corrodible leg which forms the sensing element, a reference leg which provides the temperature compensating feature, and a tap between the corrodible leg and the reference leg for transmitting the current condition at the junction between the two legs to a suitable indicating instrument such as a meter, an alarm, or suitable visual indicating means.

The metallic film, which may be on the order of 0.0001 to 0.050 inch in thickness, can be applied to the substrate by a wide variety of processes which have been employed in the art to make articles such as the well known "printed" circuits. One such technique consists in first making a layout drawing in an enlarged scale, and then photographing it. From the layout photographs, after they have been reduced to actual size, screens are made which are used to apply the circuitry. These screens may be either silk or steel mesh. After a photosensitive emulsion is applied to the surface of the screen, it is exposed to light against the photographic positive of the circuit layout. After washing the unexposed sections of the screen, it is checked for accuracy and is then ready for use.

In cathode sputtering, the material to be coated is placed on or near a metal surface which is made the anode and the metal to be deposited is made the cathode. Under the influence of a high voltage, on the order of 2000 volts or more, metal atoms in the form of ions leave the cathode and deposit on the article. A vacuum in the range from about 1 to 0.01 mm. mercury is usually employed.

Still another technique consists in laminating a shim stock of the metal to the substrate followed by etching away with acid the areas where voids are to appear in the pattern, leaving the metal in the form of a thin film in the pattern desired.

Except where quite thin films are desired, the pattern can also be formed by means of metal spraying in the form of wire or powder through a special oxy-gas gun which blows it on the surface being coated, the surface being suitably masked so that only the pattern areas are coated with the metal.

Still another technique consists in painting on the metal in the form of a coating in the pattern desired either by brushing, dipping, or spraying.

The particular metal used in the film will, of course vary with the environment whose corrosive properties are to be tested. Materials such as copper, iron, steel, zinc, nickel, silver, or various alloys and the like would all find use in different environments.

After the pattern has been formed on the substrate, all or practically all of the thus coated substrate is given an overlay which is resistant to the corrosive influences to be tested. In the case of a resinous substrate, the overlay should be a resinous material which is compatible with the substrate so that it merges cleanly with the substrate upon the application of heat or pressure or both. With thinner films, it is desirable to apply the overlay only in the areas to be protected, leaving the desired portion of the corroding element exposed. With thicker films, the entire pattern may be overlaid, and the portion of the pattern constituting the corrodible or sensing leg may be exposed by removing selected areas of the overlay by machining, sandblasting, or other suitable techniques. Similarly, the portions of the pattern which provide the take-off points for the leads from the remainder of the corrosion detecting system are exposed and the leads may be soldered or otherwise secured at these points.

A further description of the present invention will be made in conjunction with the attached sheet of drawings which illustrate the preferred embodiments thereof.

In the drawings:

FIGURE 1 is a view in elevation of a blank which can be employed in forming the probe of the present invention;

FIGURE 2 is a view in elevation of the blank after the metallic film pattern has been applied to it;

FIGURE 3 is a view similar to FIGURE 2, but illustrating the probe after the overlay has been applied, and selected areas thereof removed to expose the underlying metal; and FIGURE 4 is a cross-sectional view taken substantially along the line IV—IV of FIGURE 3, in enlarged form to illustrate the structure thereof.

As shown in the drawings:

In FIGURE 1 reference numeral 10 indicates generally a blank composed of a non-conductive substrate material which is rigid, resistant to chemical attack, and preferably resistant to high temperatures.

As indicated in FIGURE 2, the blank 10 is provided with a thin metal film 11 in the pattern indicated. This pattern includes an elongated reference leg portion 12 and a similarly elongated corroding leg portion 13 joined at their lower extremities by a connecting leg 14. To provide a tap between the electrical resistances provided by the reference leg 12 and the corroding leg 13 there is a leg 16 of metal integral with the leg 14.

Reference leg 12 is provided with two taps, a current tap 19 integral with a branch 12a and a potential tap 21 integral with a narrower branch 12b.

Similarly, the corroding leg 13 has a relatively wide branch 13a provided with a current tap 23 and a relatively narrow branch 13b provided with a potential tap 24.

After the metallic film has been applied, the entire piece is coated with an overlay generally indicated at numeral 17 in FIGURE 3. In the event that a resinous material is used as the substrate 10, the material of the overlay 17 should be compatible with it to the extent of providing a firm bond. After the overlay 17 has been applied by any suitable process such as spraying, painting, or dipping or by laminating a sheet of the material to the substrate and the metallic film, selected areas of the overlay 17 are removed to expose the underlying metal. As indicated in FIGURE 3, a substantial portion of the corroding leg 13 is exposed by removing the overlay 17 in that area, leaving a relieved portion 18. Similarly, the electrical taps for energizing the probe are exposed by a similar technique, leaving taps for connection to external wires. These taps include the current tap 19 leading to the branch 12a, the potential tap 21 leading to branch 12b, a tap 22 leading to the center leg 16, the current tap 23 for the branch 13a, and the potential tap 24 for the branch 13b.

In use, the probe of the present invention may be inserted with its narrow neck portion extending into a tube supported from a standard pin connector. After soldering the leads from the taps shown in FIGURE 3 to the respective pins, the tube may be filled with a resinous potting compound to the level of the neck portion to encapsulate that portion in a rigid resinous mounting.

From the foregoing it will be apparent that the corrosion measuring probe of the present invention provides a complete probe unit which can be manufactured in very small size and quite inexpensively. It will also be evident that various modifications can be made to the described embodiment without departing from the scope of the present invention.

I claim as my invention:

1. A corrosion measuring probe comprising a substrate of an electrically insulating material, a thin corrodible metallic film on said substrate defining a corrodible leg, a temperature-compensating reference leg, and a tap between said corrodible leg and said reference leg, and an overlay over said film protecting said reference leg against corrosion, said corrodible leg being exposed to the corrosive environment to be tested.

2. A corrosion measuring probe comprising a substrate of a rigid electrically insulating material, a thin corrodible metallic film on said substrate defining a corrodible leg, a temperature-compensating reference leg and a tap between said corrodible leg and said reference leg, said film also comprising means defining leads from said corrodible leg, said reference leg, and said tap, said leads terminating in an area of closely spaced contacts to which external leads may be applied, and an overlay over said film protecting said reference leg against corrosion, said corrodible leg and said area of closely spaced contacts being exposed to the environment.

3. A corrosion measuring probe comprising a substrate of an electrically insulating rigid resinous material, a thin corrodible metallic film on said substrate defining a corrodible leg, a temperature-compensating reference leg, and a tap between said corrodible leg and said reference leg, and an overlay over said film protecting said reference leg against corrosion, said corrodible leg being exposed to the corrosive environment to be tested.

4. A corrosion measuring probe comprising a substrate of an electrically insulating rigid resinous material, a thin corrodible metallic film on said substrate defining a corrodible leg, a temperature-compensating reference leg, and a tap between said corrodible leg and said reference leg, and an overlay of resinous material compatible with the material of said substrate over said film protecting said reference leg against corrosion, said corrodible leg being exposed to the corrosive environment to be tested.

5. A corrosion measuring probe comprising a substrate of an electrically insulating material, a metallic film having a thickness in the range from 0.0001 to 0.050 inch on said substrate in a pattern including a corrodible leg, a temperature-compensating reference leg, and a tap between said corrodible leg and said reference leg, and an overlay over said film protecting said reference leg against corrosion, said corrodible leg being exposed to the corrosive environment to be tested.

6. The method of making a corrosion measuring probe which comprises providing an electrically insulating substrate, applying a thin metallic film to said substrate in a pattern including a sensing leg and a reference leg, applying a protective overlay over said film and over said substrate, and removing at least a portion of said overlay in the area of said sensing leg to expose said sensing leg.

7. The method of making a corrosion measuring probe which comprises providing an electrically insulating substrate, applying a metallic film having a thickness in the range from 0.0001 to 0.050 inch to said substrate in a pattern including a sensing leg and a reference leg, applying a protective overlay over said film and over said substrate, and removing at least a portion of said overlay in the area of said sensing leg to expose said sensing leg.

References Cited in the file of this patent

UNITED STATES PATENTS

| | | |
|---|---|---|
| 2,551,344 | Scholl | May 1, 1951 |
| 2,993,366 | Birkness | July 25, 1961 |